US011210964B2

(12) United States Patent
Gill

(10) Patent No.: US 11,210,964 B2
(45) Date of Patent: Dec. 28, 2021

(54) LEARNING TOOL AND METHOD

(71) Applicant: Kinephonics IP Pty Limited, Clovelly (AU)

(72) Inventor: Anna Gill, Clovelly (AU)

(73) Assignee: KINEPHONICS IP PTY LIMITED, New South Wales (AU)

( * ) Notice: Subject to any disclaimer, the term of this patent is extended or adjusted under 35 U.S.C. 154(b) by 197 days.

(21) Appl. No.: 16/466,939

(22) PCT Filed: Dec. 6, 2017

(86) PCT No.: PCT/AU2017/051341
§ 371 (c)(1),
(2) Date: Jun. 5, 2019

(87) PCT Pub. No.: WO2018/102871
PCT Pub. Date: Jun. 14, 2018

(65) Prior Publication Data
US 2019/0347948 A1    Nov. 14, 2019

(30) Foreign Application Priority Data

Dec. 7, 2016 (AU) ................................ 2016905042

(51) Int. Cl.
*G09B 5/06* (2006.01)
*G06F 9/451* (2018.01)

(52) U.S. Cl.
CPC ............. *G09B 5/065* (2013.01); *G06F 9/453* (2018.02)

(58) Field of Classification Search
None
See application file for complete search history.

(56) References Cited

U.S. PATENT DOCUMENTS

| 5,717,828 A | 2/1998 | Rothenberg | |
|---|---|---|---|
| 2001/0003040 A1* | 6/2001 | Spector | G09B 17/006 434/167 |
| 2004/0218451 A1* | 11/2004 | Said | G06F 3/0481 365/222 |
| 2005/0175970 A1* | 8/2005 | Dunlap | G09B 5/06 434/185 |

(Continued)

OTHER PUBLICATIONS

Dr. Ismail Çakir,, "The Use of Video as an Audio-Visual Material in Foreign Language Teaching Classroom",The Turkish Online Journal of Educational Technology, vol. 5, Issue 4, Oct. 2006, 6 pgs.

*Primary Examiner* — Nathan Hillery
(74) *Attorney, Agent, or Firm* — Hickman Becker Bingham Ledesm LLP

(57) ABSTRACT

A learning tool and method are disclosed. The method which, when executed by a computing device comprising a display, an image capturing device, and a processor, causes the computing device to perform the steps of: generating an interactive first visual cue; displaying the visual cue in a visual cue area on the display; capturing real time footage of a user using the image capturing device while the user interacts with the computing device, and display the real time footage of the user in a video footage area on the display; generating interactive visual content associated with the first visual cue; and displaying the interactive visual content in a visual display area of the display.

20 Claims, 15 Drawing Sheets

(56) References Cited

U.S. PATENT DOCUMENTS

| | | | |
|---|---|---|---|
| 2006/0141425 A1* | 6/2006 | Ley | G09B 19/06 434/169 |
| 2006/0166172 A1* | 7/2006 | May | G09B 19/04 434/185 |
| 2007/0048697 A1 | 3/2007 | Du et al. | |
| 2011/0229862 A1* | 9/2011 | Parikh | G09B 5/067 434/156 |
| 2012/0021390 A1* | 1/2012 | Dodd | G09B 19/04 434/185 |
| 2012/0164609 A1* | 6/2012 | Kehoe | G09B 19/06 434/157 |
| 2014/0282006 A1* | 9/2014 | Bolchini | H03L 7/07 715/728 |
| 2016/0199977 A1* | 7/2016 | Breazeal | B25J 9/1694 700/246 |
| 2017/0330479 A1* | 11/2017 | Bowman | G09B 5/125 |
| 2018/0158365 A1* | 6/2018 | Roche | G09B 17/003 |

\* cited by examiner

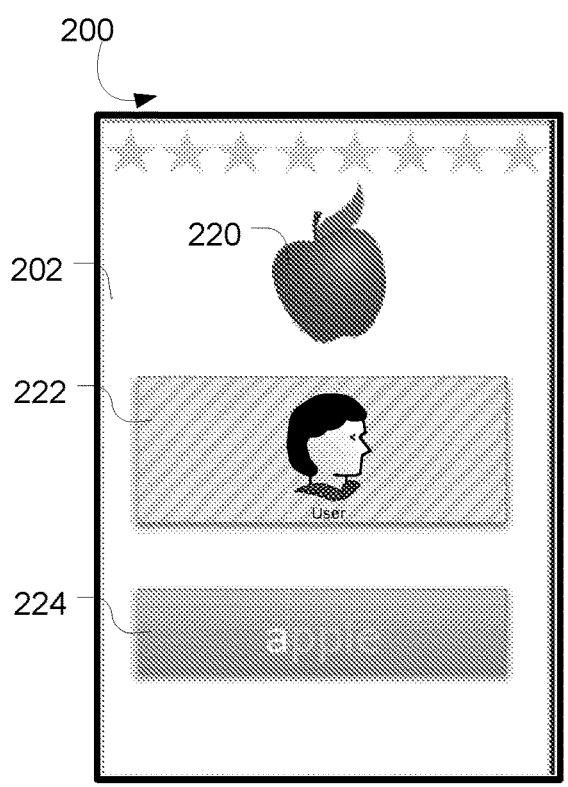
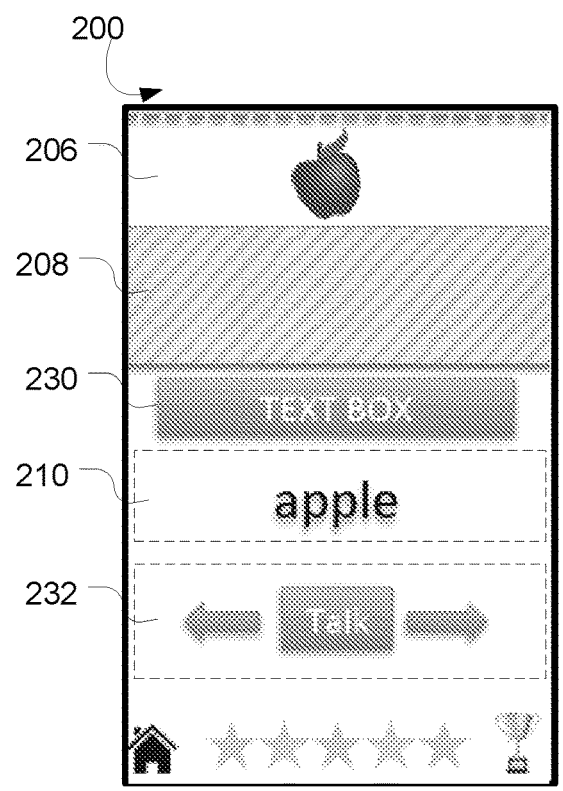
Fig. 2B                                  Fig. 2C

LEARNING TOOL AND METHOD

RELATED APPLICATION(S)

This application is a United States national stage application under 35 U.S.C. 371 of International (PCT) Application Serial No. PCT/AU2017/051341, filed on Dec. 6, 2017, which claims the benefit of Australian Application Serial No. 2016905042, filed Dec. 7, 2016, the entire disclosure of each of which is hereby incorporated by reference as if fully set forth herein.

TECHNICAL FIELD

Aspects of the present disclosure are directed to learning methods and learning tools for developing certain skills such as language skills.

BACKGROUND

Learning to read and write occurs through a combination of many life experiences as well as through teaching and learning methods over the first ten years of life and more. It is understood that no single theory of learning is the absolute answer to helping a child learn to read. However, the knowledge of the alphabet is vital for the development of skills in reading and writing.

Although traditional alphabet books teach alphabets, they do not allow a child to learn the sounds of the alphabet by themselves. This may be because the traditional mode of learning the sounds of the alphabet has been adult directed and therefore children do not have control over their learning.

Furthermore, traditional alphabet books do not engage multiple senses of the learner, which has recently been shown to be an effective way of learning and making neural pathways that help in retaining learning. The same can be said of techniques employed in teaching/learning new languages for older users.

SUMMARY

According to a first aspect of the present invention, there is provided a computer implemented method which, when executed by a computing device comprising a display, an image capturing device, and a processor, causes the computing device to perform the steps of: generating an interactive first visual cue; displaying the visual cue in a visual cue area on the display; capturing real time footage of a user using the image capturing device while the user interacts with the computing device, and display the real time footage of the user in a video footage area on the display; generating interactive visual content associated with the first visual cue; and displaying the interactive visual content in a visual display area of the display.

According to a second aspect of the present invention, there is provided a learning tool including: a display; a processor, an input device configured to receive user input; and a memory in communication with the processor. The memory includes instructions executable by the processor to cause the processor to display a plurality of user interfaces on the display, each user interface includes: a first visual cue area displaying one or more visual cues corresponding to prior learning; a video footage area displaying a real-time video footage of a user captured by the learning tool, the footage displaying the user interacting with the learning tool; and a visual display area displaying interactive visual content associated with the first visual cue; wherein the first visual cue area, the video footage area and the visual display area are arranged in sequence.

BRIEF DESCRIPTION OF THE DRAWINGS

FIG. 2B illustrates a user interface for learning to pronounce words according to some aspects of the present disclosure.

FIG. 2C illustrates a user interface for learning to spell according to some aspects of the present disclosure.

Figure 1:
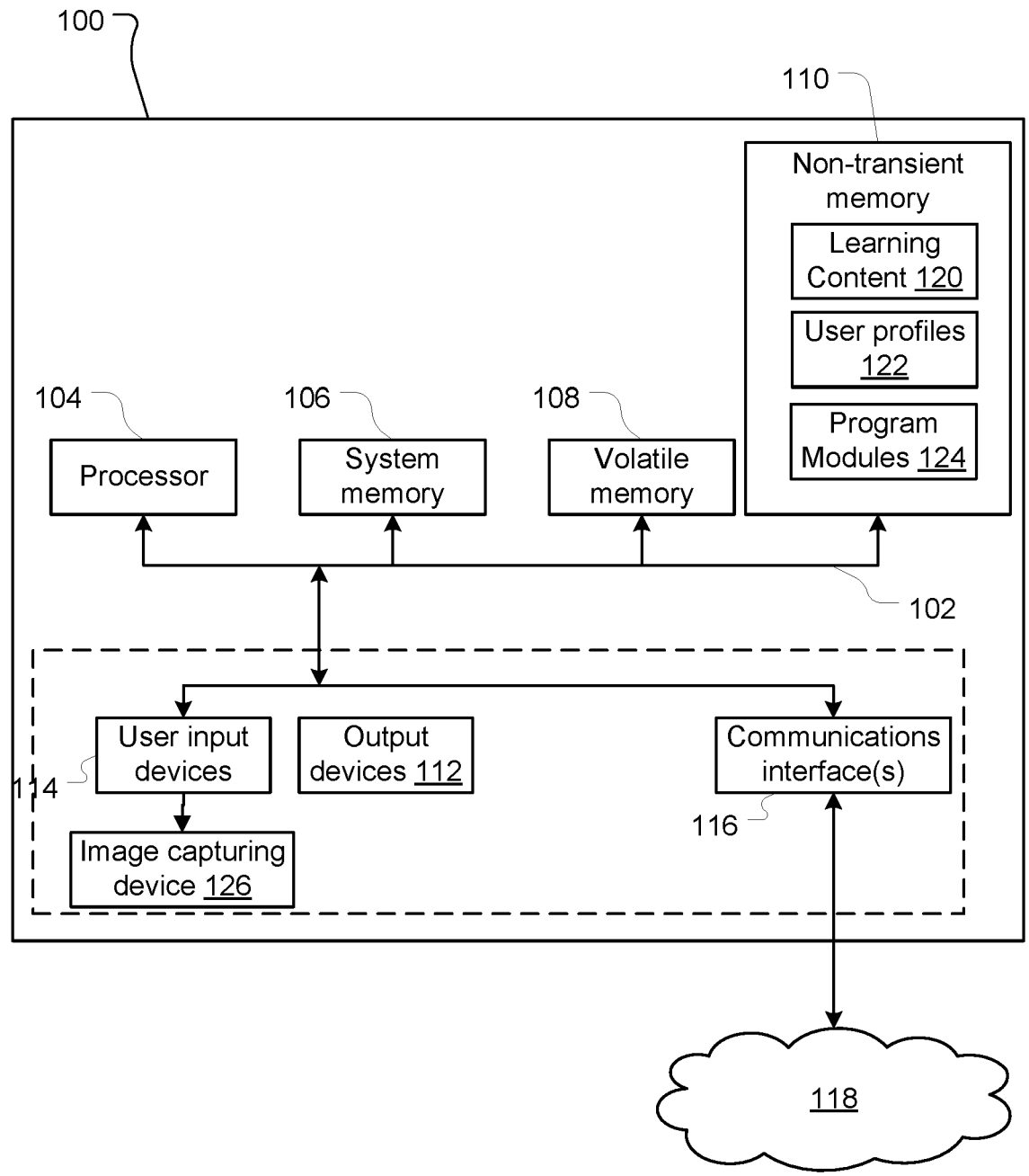
FIG. 1 is a block diagram illustrating a learning tool according to some aspects of the present disclosure.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

Overview

When learning, a user 1) gets information, 2) makes meaning of that information, 3) creates new ideas from those meanings, and 4) acts on those ideas. These four actions form the four pillars of learning: gathering, analysing, creating, and acting. Some researchers have noted that learning is physical and involves the modification, growth and pruning of neurons, synapses, and neural networks through experience. A key condition of this type of neural learning is self-driven motivation and a sense of ownership of the learning. Furthermore, in order to feel that a user is making progress, the learning cycle needs to self-perpetuate. Traditional learning books usually fail to inculcate a self-driven motivation as they are typically led by adults and often fail to perpetuate the learning cycle.

It is also understood that phonemic awareness has to be achieved before reading and comprehension can be attained. Phonemic awareness is a subset of phonological awareness in which listeners are able to hear, identify and manipulate phonemes, the smallest units of sound that can differentiate meaning. For example, separating the spoken word "cat" into three distinct phonemes, /k/, /æ/, and/t/, requires phonemic awareness. It is the ability to identify and manipulate the distinct individual sounds in spoken words.

Phonemic awareness has been considered to be a strong predictor of long-term reading and spelling success and can predict literacy performance more accurately than variables such as intelligence, vocabulary knowledge, and socioeconomic status.

However, phonemic awareness is not just about what is heard but also includes other senses such as sight, sound, kinaesthetic and proprioception. Furthermore it is recently understood that controlling speech movements for producing the syllables that make up a spoken utterance requires a complex integration of many different types of information by the brain, including auditory, tactile, proprioceptive, and muscle command representations.

Aspects of the present disclosure are directed to learning tools, methods, and user interfaces that combine these latest brain research understandings with those of learning to attain phonemic awareness. Particularly, the disclosed tools use several cognitive senses—sight, sound and proprioception (feel of mouth position) and connect with the neurological view of learning that stresses the extensive connections between the senses.

Specifically, learning methods, tools, and user interfaces are disclosed that aid in articulating, reading, writing, and spelling based on combining multi-sensory information and recognizing a user's mouth movements when sounding words.

To that end, the disclosed learning tool allows a user to learn using visual, oral, auditory, kinaesthetic, and proprioception modes of learning. The different learning modes may be displayed sequentially in a user interface. For example, in certain embodiments, the learning modes may be arranged in a single continuous plane, in such a manner that content a user already knows (also referred to as 'prior knowledge') is displayed at the beginning of the plane whereas information that a user has not previously learnt (also referred to as 'new knowledge') is displayed towards the end of the plane. Then, by traversing information from the beginning to the end of the continuous plane, a user is able to apply prior knowledge to help learn new knowledge and thereby form synaptic neuro-connections that enable the user to learn and retain knowledge effectively.

It will be appreciated that in some embodiments, the continuous plane may extend over a single user interface page, whereas in other embodiments, the continuous plane may extend over multiple user interface pages.

In some embodiments, the learning tool is configured to capture real-time footage of a user's mouth while the user is using the learning tool and display a real-time video of the captured footage on a display of the learning tool. This in effect acts as a mirror—allowing a user to see their mouth as they interact with the learning tool. In addition to the video, the learning tool also displays a visual cue, such as a picture of a word or the word itself. The user can then, looking at their mouth in the video, sound the words depicted by the visual cue. In doing so, the user can view how their mouth moves (kinaesthetic sense) when making the sound and feel the mouth position (proprioception), in turn forming a mental connection between the visual aspects of the word, the way it sounds, and the way the user's mouth moves when making that sound.

The learning tool can also provide aural instructions at certain instances during this learning process so that the user can connect the visual (visual cue), aural (aural instructions), oral (the sound of the user sounding the word), kinaesthetic (movement of the mouth while making the sound), and proprioception (feel of the mouth position) to enhance learning.

In some embodiments, the learning tool includes a speech recognition module configured to detect the sound made by the user and processes it as an oral input. The speech recognition module then compares the oral input with a reference oral sample of the correct pronunciation of the word. If the detected oral input sufficiently matches the reference oral sample, the learning tool may activate an interactive control (such as a touch sensitive area on the screen, a selectable button, a swipe bar, etc.) allowing a user to interact with the learning tool to proceed to the next word/continuous learning plane.

Alternatively, if the oral input fails to sufficiently match the reference oral sample, the learning tool may be configured to extend interaction for that particular word. For example, the learning tool may generate aural and/or visual instructions requesting the user to repeat the sound. In other examples, the learning tool may utilize haptic feedback in addition to or instead of the aural and/or visual instructions to indicate that the user has mispronounced the sample. If the oral input is completely different from the reference oral sample, the learning tool may be configured to display the word on the screen or generate an audio of the correct pronunciation of the word and ask the user to repeat the word.

In response to one or more of these interactions, the user may retry to sound the word (again watching and feeling their mouth make the word, thereby strengthening the connection between the visual, oral, auditory, kinaesthetic and proprioception learning). This process may be repeated until the detected oral input matches the reference oral sample. Alternatively, it may be repeated for a predetermined number of times. Thereafter, the learning tool may activate the interactive control, allowing the user to proceed to the next stage.

In certain embodiments, the learning tool may alternatively or in combination include a facial recognition module that is configured to detect the user's mouth movements when they sound the displayed word and compare these facial movements with reference ideal facial movements for making the corresponding sound. If the facial movements substantially match the reference facial movements, the learning tool decides that the user has made the correct sound. If the mouth movements are substantially different from the reference facial movements, on the other hand, the learning tool may generate aural instructions requesting the user to repeat the sound and/or show a short footage of the ideal mouth movements to make that sound.

When facial recognition is used in combination with speech recognition, the learning tool can determine with greater accuracy whether the user has made the correct sound and mouth movement when sounding the words by utilizing both the oral and visual inputs to determine whether the user has pronounced the word sufficiently accurately or not.

Generally speaking, the learning tool provides multi-sensory information including visual information (e.g., in the form of text, an image, or a video), auditory information (e.g., in the form of spoken words, instructions or commands), and kinaesthetic information (e.g., in the form of a video footage of the user sounding the words), which together allow the user to make connections between visual, auditory, oral, kinaesthetic and proprioception learning, thereby learning to articulate more accurately.

In some embodiments, the systems and methods disclosed herein also provide a learner with adequate phonology needed to master a writing system, which is also achieved through visual, auditory, and kinaesthetic knowledge of sounds.

In yet other embodiments, the presently disclosed learning tool allows users to learn to speak or write a foreign language accurately and easily.

The Learning Tool

Aspects of the present disclosure are implemented on a learning tool for learning to articulate, read, write and spell. The learning tool may be a special purpose computing device that is hard-wired to perform the relevant operations. Alternatively, the learning tool may include digital electronic devices such as one or more application-specific integrated circuits (ASICs) or field programmable gate arrays (FPGAs) that are persistently programmed to perform the relevant operations. Further alternatively, the learning tool may include one or more hardware processors programmed to perform the relevant operations pursuant to program instructions stored in firmware, memory, other storage, or a combination.

The learning tool may also combine custom hard-wired logic, ASICs, or FPGAs with custom programming to accomplish the relevant operations described herein. In certain embodiments, the learning tool may be a desktop computer system, a portable computer system, a handheld device, a networking device, a mobile device or any other device that incorporates hard-wired and/or program logic to implement relevant operations.

It will be appreciated that the learning tool may be utilized by users of varying ages and backgrounds. To cater to such a large range of users, the learning tool may be configured to download and store learning content pertinent to the users of the device. For example, if the user is a 6 year old American child, the learning tool may be configured to retrieve content (from an external source, for example) appropriate for a 6 year old child and retrieve reference audio samples in an American accent. Alternatively, if the user is a French adult, the learning tool may be configured to retrieve learning content for the adult in French.

It will be appreciated that if multiple users use the same device, it may retrieve and store content for each of the users. Then depending on the user identified by the learning tool (either through user input or recognition from a captured image), the learning tool may utilize content suitable for the identified user during an interaction session.

In other embodiments, users may use their own content for learning. For example, users may load videos, images, or text from one or more external sources such as e-books, YouTube® channels, emails, messages, pictures or video libraries, or any other multimedia application executing on their computing device/learning tool.

For user based customization, the learning tool may request users to create user profiles when they first interact with the learning tool. For example, the device may request a user to provide information such as age, gender, location, language, etc. This information may be used to retrieve appropriate learning content for the user. The learning tool may also request the user to provide biometric information or a picture of themselves so that the learning tool can identify which user is interacting with the teaching device at any given time (using the facial recognition module, for example). If it identifies a user different from the registered users of the device, the learning tool may be configured to request the user to register and complete their profile before they can initiate a learning session.

By way of example, FIG. 1 provides a block diagram that illustrates one example of a computing device upon which embodiments of the invention may be implemented. As described previously, the computing device may be a standalone device dedicated to run and execute a learning program or it may be a multipurpose computing device such as a PC, a tablet, or a mobile phone onto which a software program for learning can be installed and executed in addition to other software programs.

Learning tool 100 includes a bus 102 or other communication mechanism for communicating information, and a hardware processor 104 coupled with bus 102 for processing information. Hardware processor 104 may be, for example, a microprocessor, a graphical processing unit, or other processing unit.

In terms of storage, the learning tool 100 includes a main memory 106, such as a random access memory (RAM); a volatile memory 108 (e.g., a ROM) for storing static information and instructions, and/or a non-transient memory 110 (e.g., a storage device). One or more of these memory modules store data such as learning content 120 and user profiles 122, and program modules 124 for execution by the processor 104. The memory modules are coupled to bus 102.

The program modules 124 may be stored as independent instruction modules such as a speech recognition module, a facial recognition module, an image capturing and/or processing module, an input module etc. These modules may be invoked in any given order or concurrently depending on the learning process. Moreover, one program module may invoke one or more other program modules during operation without departing from the scope of the present disclosure.

Further, data may be stored in one or more databases maintained by the learning tool 100. For example, one database may store program modules, another database may store learning content 120, another database may maintain a user's learning progress and a further database may store user profiles 122, for example. These databases may be implemented as relational databases in one example.

The main memory 106 may also be used for storing temporary variables or other intermediate information during execution of instructions to be executed by processor 104. Such instructions, when stored in non-transitory storage media accessible to processor 104, render learning tool 100 into a special-purpose machine that is customized to perform the operations specified in the instructions.

The learning tool 100 may also include output devices 112 to provide an output. The output devices include a display (such as an LCD, LED, touch screen display or other display), for displaying a user interface and an audio device (e.g. a speaker, headphones, or other audio device) configured to output sound in accordance with instructions received from the processor 104. In some embodiments, the learning tool 100 may also include a unit that generates haptic feedback (e.g., vibrations) in response to one or more actions.

The learning tool also includes one or more user input devices 114 to receive user input. These input devices may be in the form of a touch sensitive panel (not shown) physically associated with the display to collectively form a touch-screen, a keypad (not shown) coupled to the bus 102 for communicating information and command selections to processor 104, a cursor control (not shown) for communicating direction information and command selections to processor 104 and for controlling cursor movement on the display, a microphone for detecting audio inputs, and/or an image capturing device 126 such as a camera or video recorder (for detecting visual inputs, capturing footage of the user, etc.).

According to one embodiment, the techniques herein are performed by the learning tool 100 in response to processor 104 executing sequences of one or more instructions (e.g. the modules described previously) contained in main memory 106. Such instructions may be read into main memory 106 from another storage medium, such as a remote database (not shown) or the non-transient memory 110. Execution of the sequences of instructions contained in the main memory 106 causes the processor 104 to perform the process steps described herein. In alternative embodiments, hard-wired circuitry may be used in place of or in combination with software instructions.

Learning tool 100 also includes a communication interface 116 coupled to bus 102. Communication interface 116 provides two-way data communication coupling to a network link that is connected to a communication network 118. For example, communication interface 116 may be an integrated services digital network (ISDN) card, cable modem, satellite modem, etc. As another example, communication interface 116 may be a local area network (LAN) card to provide a data communication connection to a compatible LAN. Wireless links may also be implemented. In any such implementation, communication interface 116 sends and receives electrical, electromagnetic or optical signals that carry digital data streams representing various types of information.

Learning tool 100 can send messages and receive data, including learning content and program code, through the network(s) 118, network link and communication interface 116. For example, the learning tool 100 may periodically or in response to a trigger condition download/upload learning content 120 and/or user profiles 122 from/to an external server (not shown). The received learning content 120 may be executed by processor 104 as it is received, and/or stored in non-transient memory 110, or other non-volatile storage for later execution.

Figure 9:
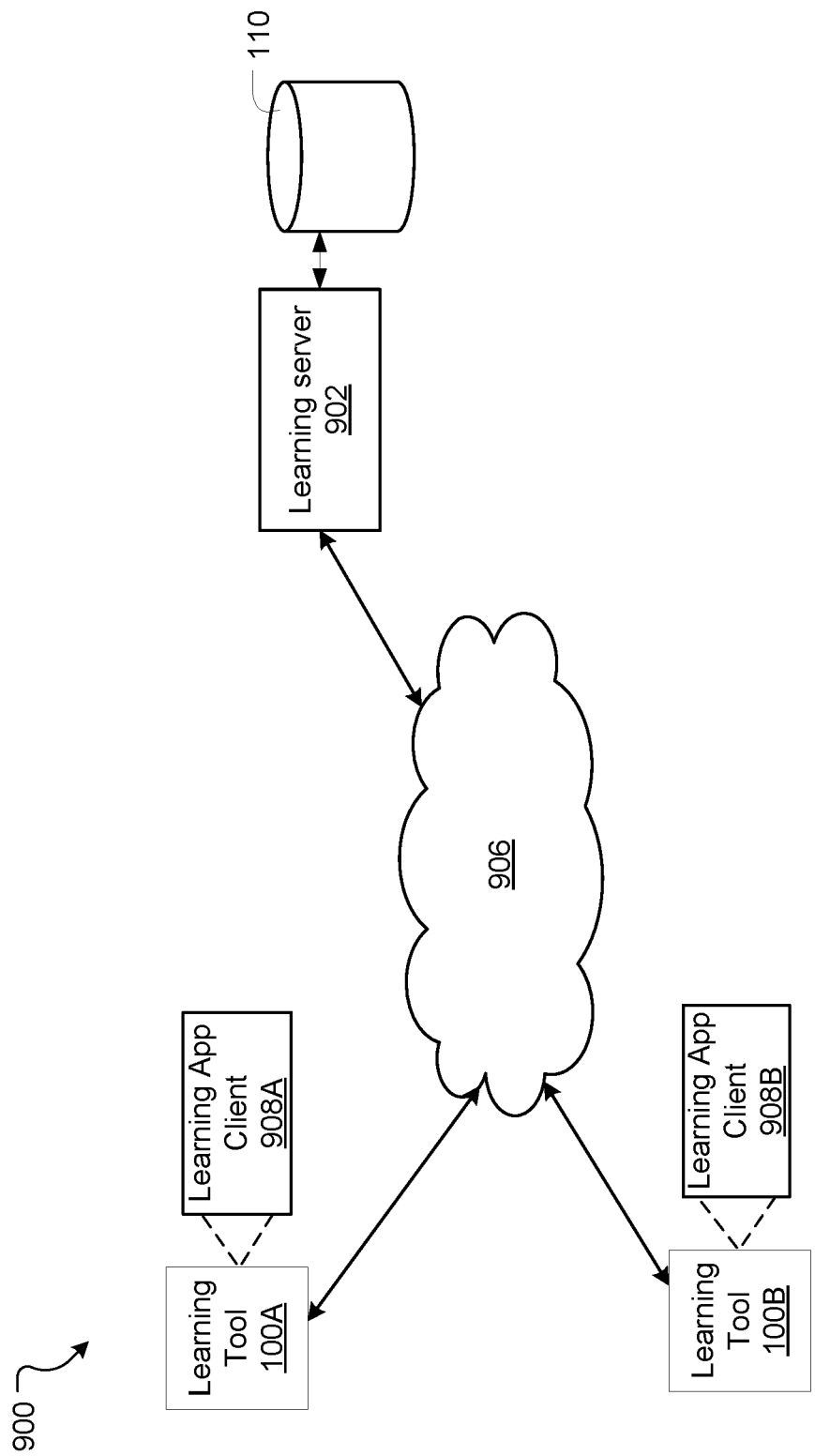
FIG. 9 is a schematic diagram of an example network environment in which aspects of the present disclosure may be implemented.

In FIG. 1 the learning tool 100 is shown as a standalone computing device onto which learning software program (in the form of instructions) can be installed and executed to perform the functions described herein. In other embodiments the learning tool may be part of a server-client architecture, in which the learning tool includes a client in communication with a server that hosts the learning software program and learning content. FIG. 9 illustrates an example of this network architecture.

As seen in FIG. 9, the network 900 includes a server computing device 902 in communication with multiple learning tools 100A, 100B via a communication network 906. The learning tool 100 may be any suitable device, for example a mobile device (e.g. a tablet or mobile phone), a portable device (such as laptop computer), or any other computing device (e.g. a desktop computer).

Each learning tool 100 may include a learning app client 908. The learning app client includes instructions stored in the memory (e.g. non-transient memory 110) of the device on which it is installed/run. These instructions are executed by a processor (e.g., processor 104) to perform various functions as described herein, including the processes described with reference to FIGS. 3, 4, 6 and 8.

The learning app client 908 may be implemented in various ways. For example, the learning app client 908 may be an application which accesses the learning server 902 via appropriate uniform resource locators (URL) and communicates with these systems via general world-wide-web protocols (e.g. HTTP, HTTPS, FTP). Alternatively, the learning app client 908 may be a specific application programmed to communicate with the learning server 902 using defined application programming interface (API) calls.

Generally speaking, the learning server 902 is configured to maintain user profiles, authenticate users, maintain learning content, and exchange data (e.g., learning content and user progress) with one or more learning app clients 908. To authenticate users and provide learning content, the learning server 902 maintains user profiles and learning content for multiple users. In some embodiments, the learning server 902 may be provided by dedicated hardware infrastructure. Alternatively, the learning server 902 may be hosted by a cloud platform.

In still other embodiments, the learning software program may be accessible from the web server 902 by one or more third party web applications or websites. In these cases, the third party web applications or websites may be able to invoke the learning software program by installing a widget or add-on or providing a link (e.g., URL) to the learning software program. When a user visits the third party website, the user can run the learning program by interacting with the widget, add-on, or link. For example, a language translation web application such as Google Translate may install a widget or even provide a link to the learning program. When the user interacts with the widget or the link, the learning program may be executed on the user's computing device via their web browser.

Example User Interfaces

Generally speaking, the learning tool 100 displays a user interface that presents multi-sensory information to a user in such a manner that learning experiences are organised and presented in sequence, from beginning to end, on one continuous plane. The information presented in a single plane is considered a learning unit. When a user completes a learning unit successfully, the user may progress to the next learning unit (which is also displayed on a continuous plane). The continuous plane is a presentation of the whole learning process (the macro) while allowing for the presentation of individual learning connections (the micro learning) for learning to read and/or speak. Each micro-learning step utilizes four stages of learning cycle (concrete experience, reflective observation, abstract hypothesis, and active testing) and is presented as one uninterrupted learning cycle and put together to give rise to the understanding of the process and strategy of developing reading and language skills.

The multi-sensory information may be presented on the continuous surface as contact points that allow a user to bridge neural networks between prior knowledge and new knowledge. When neural networks between senses are bridged, two learning steps of reflective observation and abstract hypothesis occur. This bridging is the time for learning or the utilisation of the working memory.

At each contact point in the continuous surface a combination of different senses may be exercised. Typically, one sensory experience is shared between two contact points. This sharing of sensory experience between two contact points is the bridging of the neuronal network and allows the transfer of knowledge.

It will be appreciated that the continuous plane may be a longitudinal surface beginning at the top of the display and ending at the bottom of the display when the learning tool 100 is held in a portrait orientation. Alternatively, the continuous plane may be a transverse surface, beginning at the right or left of the display screen and ending at the left or right, respectively, of the display screen when held in a landscape orientation. For example, in some cultures, language is written from right to left whereas in others it is written from left to right. The continuous plane can be adapted to be right to left or left to right depending on cultural preferences.

FIGS. 2A-2G illustrate screenshots of an exemplary user interface 200 at different times during the learning cycle. As noted previously, the user interface 200 includes a single plane 202 on which individual learning areas are displayed. In the following figures, the plane 202 is depicted as extending from top to bottom of the user interface 200. It will be appreciated that this is an example depiction and that in other embodiments, the plane 202 can extend from left to right or right to left without departing from the scope of the present disclosure as long as prior knowledge is presented towards the beginning of the plane and new knowledge is presented towards the end of the continuous plane. In yet other embodiments, the plane 202 may extend over multiple pages.

Figure 2A:
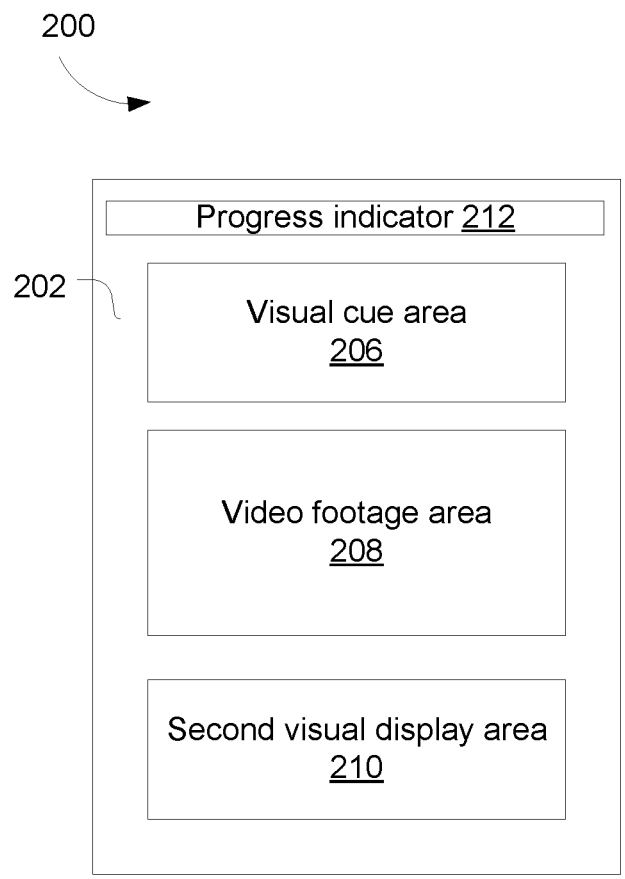
FIG. 2A illustrates a user interface for learning according to some aspects of the present disclosure.

As depicted in FIG. 2A, the user interface 200 includes a visual cue area 206 for displaying one or more visual cues, and a video footage area 208 for displaying video footage. In some embodiments, the visual cues are interactive (i.e., selection of the visual cue triggers a second function—such as aural sounds, aural instructions, activation of the video footage, etc.). For example, if the user selects a visual cue depicted in the visual cue area 206, the learning tool is configured to start capturing video footage of the user and display that footage in the video footage area 208. In another example, animated waves may be displayed in the visual cue area. When these waves are selected, the learning tool may produce the sound of waves crashing. This allows hearing impaired users to use the device and presents complex ideas for young children.

The user interface also includes a visual display area 210 to display additional interactive visual content associated with visual cues displayed in the visual cue area 206. The visual content includes visual cues (such as the actual words associated with visual cues in contact point 206), interactive controls to progress learning, interactive controls to generate aural signals, or interactive controls to enable one or more additional features (such as a thesaurus, dictionary, or translation feature).

In some embodiments, the user interface 200 may further include a progress indicator 212 indicating a user's progress through the learning process. The progress indicator may be presented as a progress bar, which increases in length as the user progresses through the learning, or as multiple symbols, which increase in number as the user progresses from one learning unit to another. In the example user interface 200, the progress indicator 212 is depicted at the top of the continuous learning plane. However, it will be appreciated that in other embodiments, the progress indicator 212 may be displayed at the bottom, left or right of the continuous plane without departing from the scope of the present disclosure.

FIG. 2B illustrates an example user interface 200 when the learning tool 100 is configured to aid in learning to pronounce words. The user interface 200 includes a visual cue 220 in the visual cue area (in this example a picture of an apple), a video footage 222 in the video footage area, and a second visual cue 224 (the word apple in this example) in the visual display area 210. In some embodiments, the visual cue, video footage and second visual cue are displayed in order, interspersed with one or more aural instructions. For example, the visual cue 220 is displayed first followed by one or more aural instructions. User interaction with this visual cue 220 causes the learning tool 100 to display the video footage 222 (i.e., a real time video of the user's face), which is again followed by one or more aural instructions. After a predetermined time, the second visual cue 224 is displayed.

FIG. 2C illustrates another example user interface 200, in which the learning tool is configured to aid in learning to spell. In this case, the plane 202 includes the visual cue area 206, the video footage area 208, an input area 230, a visual display area 210, and a visual interaction area 232. The user interface also includes controls to go back to a home page (the home icon) and to view user progress (the cup icon). The progress indicator 212 is also depicted.

Figure 2D:
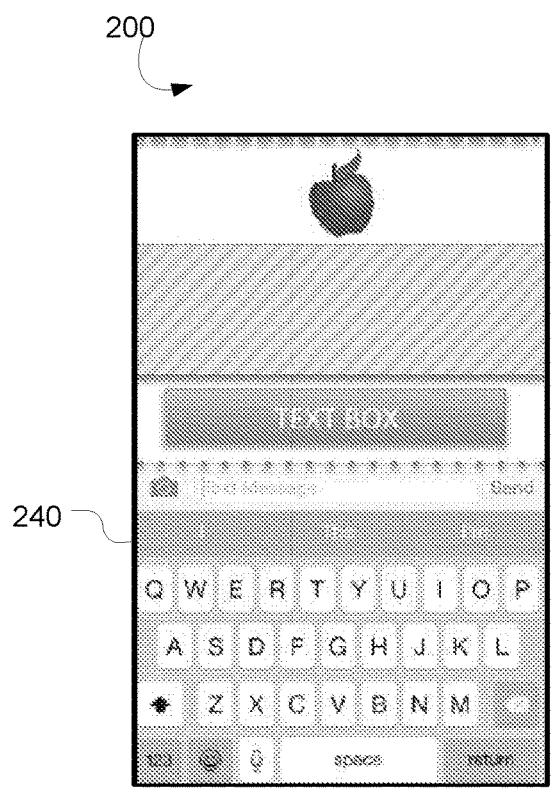
FIG. 2D illustrates the user interface of FIG. 2C with a touchscreen keyboard activated.

The input area 230 may be utilized to input text. For example, it may be utilized to input a word, phrase or sentence corresponding to the visual cue displayed in the visual cue area 206. To this end, the input area 230 may be interactive—i.e., when a user selects the input area, a touchscreen keyboard 240 may be displayed (in case the learning tool 100 is a touchscreen device) as shown in FIG. 2D. Alternatively, a cursor may be activated in a textbox allowing a user to enter text using a keyboard coupled to the learning tool. When the keyboard is displayed, the keyboard 240 may cover the visual display area 210 and the visual interactive area 232. Once the user has finished entering text, the keyboard may disappear, thereby once more revealing the visual display area 210 and the visual interactive area 232

The visual interaction area 232, as depicted in FIG. 2C may be an interactive button, which when selected causes the learning tool 100 to generate a sound based on the input text. For example, it may be configured to generate an aural signal pronouncing the word entered in the input text area. Alternatively, when the interactive button is selected, the learning tool may generate an aural instruction informing the user whether the spelling of the text entered in the input area 230 is correct or incorrect.

As depicted in FIGS. 2B and 2C, prior learning (i.e., the visual cue) is displayed at the top of the continuous plane 202, whereas new knowledge area (i.e., the second visual cue in FIG. 2B and the input area in FIG. 2C) is displayed towards the bottom of the continuous plane 202, with the video footage 208 in the middle of the prior knowledge and new knowledge areas. This arrangement allows the brain to form synaptic connections between their prior learning and new learning thereby allowing a user to learn more effectively.

Figure 2E:
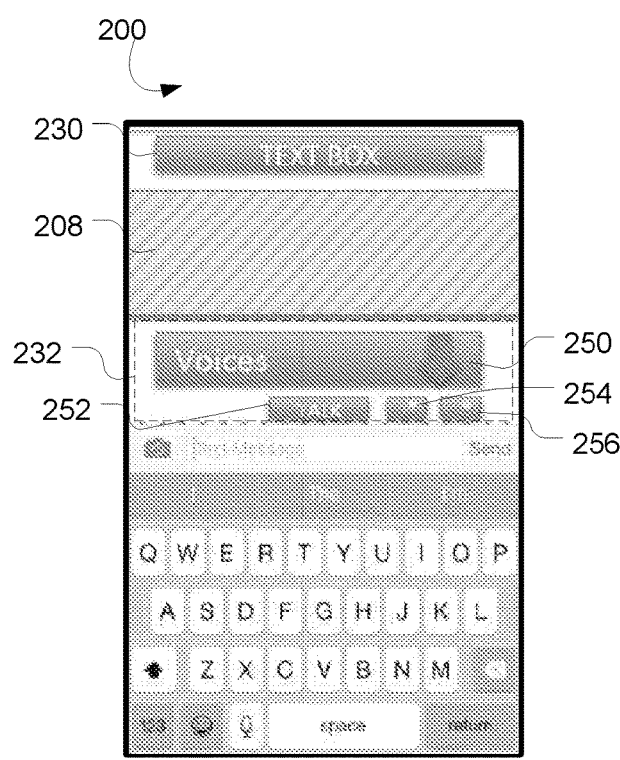
FIG. 2E illustrates a user interface for learning to read and write according some aspects of the present disclosure.

FIG. 2E illustrates another example user interface 200 of the learning tool 100, in which the learning tool is configured to aid in learning to write and read. In this case, the user interface 200 includes a visual cue in the form of an input box 230 in the visual cue area 206, a video footage area 208, and interactive visual content in the form of interactive controls 232 in the visual display area 210.

As noted previously, the input box 230 includes a text box into which a user may enter text. The interactive controls 232 include interactive buttons to select one or more features of the learning tool 100. In this example, the interactive controls 232 include a drop down menu 250 for selecting a voice in which the learning tool communicates with the user, a 'talk' button 252, which when selected triggers the learning tool to provide an answer, instruction or guidance to the user. The interactive controls 232 further include a 'dictionary' button 254 and a 'thesaurus' button 256. These buttons when selected cause the learning tool 100 to visually or aurally present the meaning of a word entered in the input box 230 or provide a list of similar words to the word entered in the input box 230.

Figure 2F:
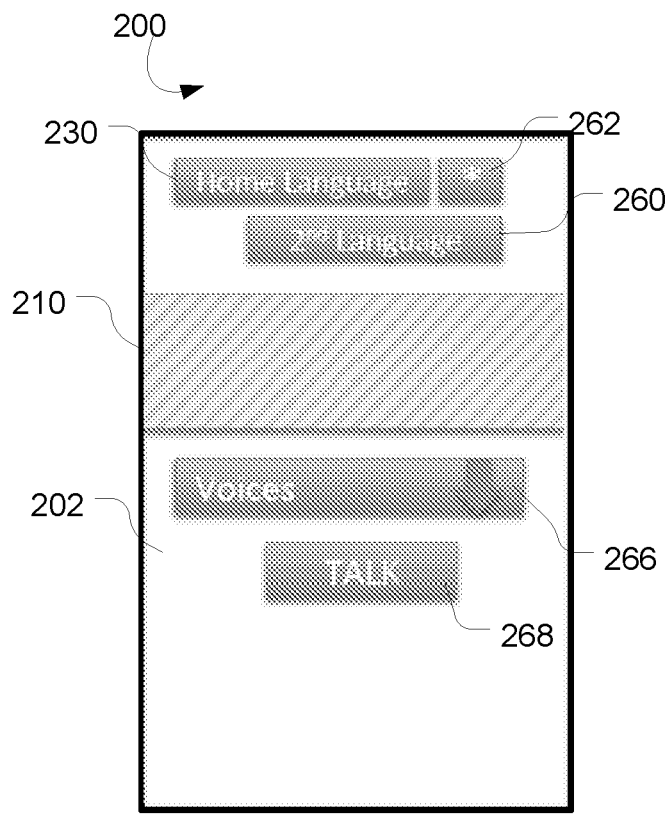
FIG. 2F illustrates a user interface for learning a different language according to some aspects of the present disclosure.

FIG. 2F illustrates an example user interface 200, when the learning tool 100 is configured to aid in learning a different language. In this particular application, the learning tool 100 helps a user learn to pronounce and spell in a different language. To that end, the learning tool 100 includes a spellchecking interactive control and a video footage of the user's mouth to allow the user to improve and practise pronunciation by watching their mouth move.

In this particular application, the learning tool is beneficial for users who can speak a language and are familiar with vocabulary words but find it difficult to become fluent in the language.

The continuous plane 202 includes visual cues in the form of an input box 230 in the visual cue area. A user may utilize the input box to input a word, phrase or sentence in the user's native language. The visual cue area 206 may also include another visual cue in the form of translation area 260 that displays the translated sentence when the learning tool translates the text from the native language into a second language. The learning tool 100 may perform the translation automatically after the user enters text in the input box 230. Alternatively, the translation may be performed in response to a user requesting the learning tool 100 to translate the text by selecting an interactive 'translate' button (not shown).

Furthermore, in the visual display area 210, an interactive control 266 may be provided to select a voice, similar to the voice selection drop down menu 250 of FIG. 2E. The interactive control 266 may be in the form of a dropdown menu or something similar. Using the interactive control 266, a user may select the voice with which the learning tool interacts with the user during learning.

Finally, the user interface also includes visual content in the form of an interactive control 268 in the visual display area 210, which when selected sounds the translated text entered in input box 230.

Figure 2G:
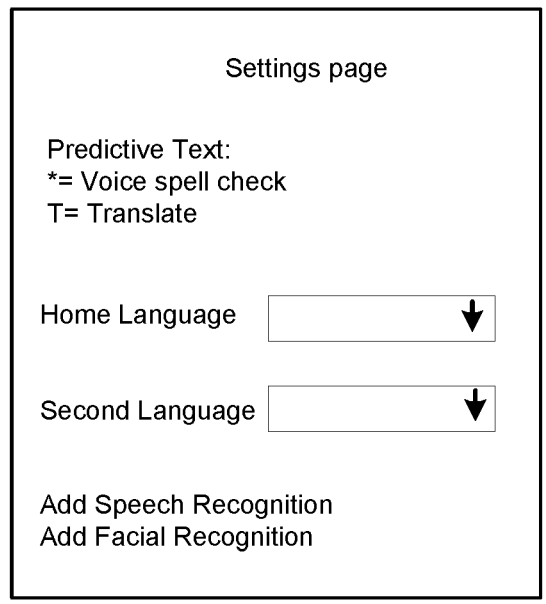
FIG. 2G illustrates an example settings page.

As noted previously, the learning tool 100 may be customized by users. FIG. 2G illustrates an example settings page. The customizable settings include home language (i.e., the language in which the device communicates), other language(s) (language(s) into which translation is required), a control to enable/disable the translate interactive control, a control to enable/disable an aural spell check option (which when enabled checks the spelling of the text entered in the input box and provides an aural instruction regarding the correctness of the text), a speech recognition option (which when selected invokes the speech recognition module to compare user speech input with reference samples to determine whether the user has correctly pronounced a word, phrase or sentence), and a facial recognition option (which when selected invokes the facial recognition module to compare a user's facial movements with reference facial movements to determine whether the user has correctly moved their mouth to make the appropriate sounds). Other settings options include an option to select the voice for aural instructions. Users may be able to select from voices of different genders and accents. If the voice selection option is available in the setting page, it might not be displayed in the actual learning unit user interfaces of FIGS. 2E and 2F.

It will be appreciated that depending on the particular application (i.e., to learn phonics, spelling, reading, writing or a different language), one or more of the settings options may be displayed. For example, speech recognition and facial recognition options may be provided for all applications whereas the second language selection option may be provided only for the language application.

In the example user interfaces described above, the input box is illustrated as an area where a user is allowed to enter text. In other examples, the input box may be utilised to load one or more multimedia files such as a video file, an image file, or a sound file without departing from the scope of the present disclosure.

Example Process

Figure 3:
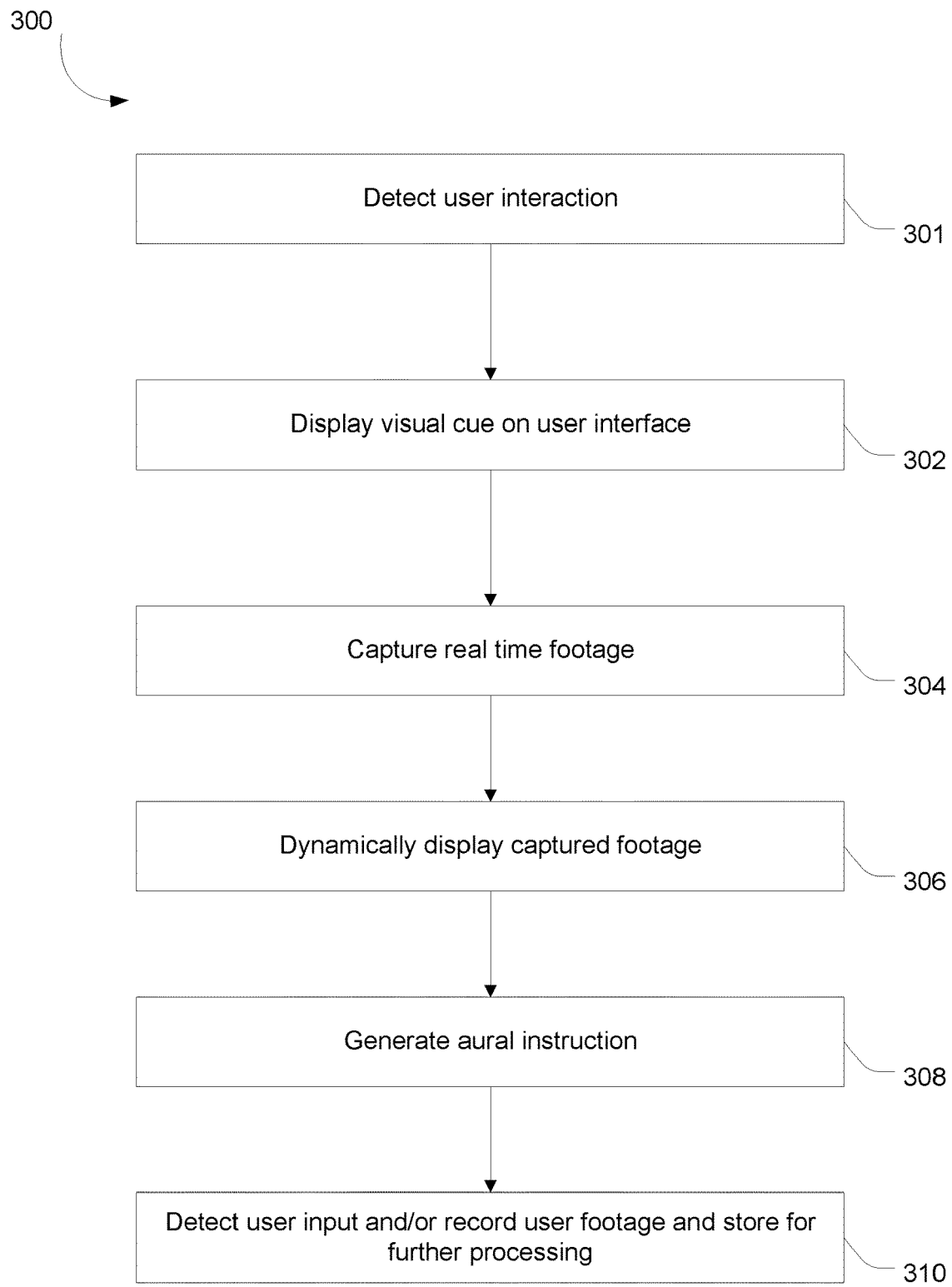
FIG. 3 is a flowchart illustrating an example method for learning according to some aspects of the present disclosure.

FIG. 3 illustrates an exemplary method 300 for facilitating learning according to some aspects of the present disclosure. The method begins at step 301, when the learning tool detects user interaction. If the learning tool 100 is incorporated as a software application in a user device, such as a computer, laptop, notepad, mobile device, etc., this may be detected, for example, when a user selects an icon corresponding to the learning tool 100 on their user device. Alternatively, when the learning tool is a standalone device, user interaction may be detected when the device is moved from a stationary position or the device is powered on, for example.

Next (at step 302), the learning tool 100 generates and displays a visual cue on the device screen. The visual cue may be an interactive button, an input box, a picture of a word (e.g., the picture of a cat, an apple, a tree, etc.) a word, a phrase, a sentence, or any other type of visual cue. The type of visual cue presented may depend on the learning application, the user profile and the type of learning required. For example, if the user is a 3 year old who has little or no prior reading experience and is using the learning tool to learn phonetics, the learning tool may display a pictorial cue associated with a word from the learning content 120 appropriate for a 2-4 year-old with limited reading experience and display that picture on the user interface 200 in area 206. Alternatively, if the user is an adult or an older child that is proficient in reading, the learning tool 100 may display an input box 230 or retrieve a word/phrase/sentence from the learning content 120 appropriate for a more experienced reader and display the word/phrase/sentence on the user interface in area 206.

It will be appreciated that the learning tool 100 can display a combination of pictures, videos, or letters (depending on the user and required learning) without departing from the scope of the present disclosure.

At step 304, the learning tool 100 begins to capture real time footage of the user. This step may be performed once the visual cue is displayed or in response to some user interaction with the user interface 200. For example, the learning tool 100 may begin to capture video footage once a user selects a particular action (such as depressing a keyboard key, moving a mouse pointer, selecting the visual cue 220 or video footage area 208). In certain embodiments, the user performs the required action in response to an aural instruction from the learning tool 100.

In some embodiments, the learning tool 100 may statically capture footage of an area directly above the screen of the device. This may be useful is some cases but may be ineffective if the user is positioned at an angle to the learning tool, or is in constant motion with respect to the learning tool. In these cases, the learning tool may include one or more sensors that sense the face of a user closest to the learning tool and aim the image capturing device 126 in the direction of the selected user's face so that the learning tool 100 may capture footage of the user's face as the user interacts with the learning tool. Moreover, the learning tool may perform this sensing and area adjustment in the background while the user interacts with the learning tool and may stop once the interaction is ended. If no user is detected for a predetermined period of time (e.g., 2-5 minutes), the learning tool may be configured to automatically exit or power off.

The captured footage, at step 306, is dynamically processed and converted into a video to be displayed in the video footage area 208 on the user interface 200. In some embodiments, the learning tool 100 may be configured to crop, enhance, zoom-in or in any other way process the captured footage to improve the quality of the video displayed in the user interface 200.

At step 308, the learning tool produces an aural instruction. Generally speaking, the aural instruction requests the user to speak while looking at the mirror. The actual instructions may vary depending on the particular learning application. For instance, in case the method 300 is used for learning phonetics, the aural instructions may request the user to sound the word represented by the visual cue 220 while looking at the mirror. Alternatively, in case the application is used for learning to read, write, spell or speak another language, the instruction may be to sound any word the user wishes to learn while looking at themselves in the video footage 222.

At step 310, the learning tool 100 optionally detects the user's utterance and stores it for further processing. The learning tool may also optionally record footage of the user sounding the words at this stage.

Depending on the particular application, after the user utters one or more words while looking at themselves in the video footage 222, the learning tool may perform one or more different functions. The following example processes depict some of these example functions. Moreover, the following figures depict exemplary learning processes in more detail.

Learning Application 1: Learning Sounds in Words

According to one embodiment, the learning tool 100 allows a user to learn the sounds in words by watching their mouth move. When learning to read, users need to understand the complex nature of phonemics in order to become fluent. Using the disclosed learning tool 100, a user can have a truly multi-sensory experience where connections are made between visual, auditory, oral, kinaesthetic, and proprioception.

Figure 4:
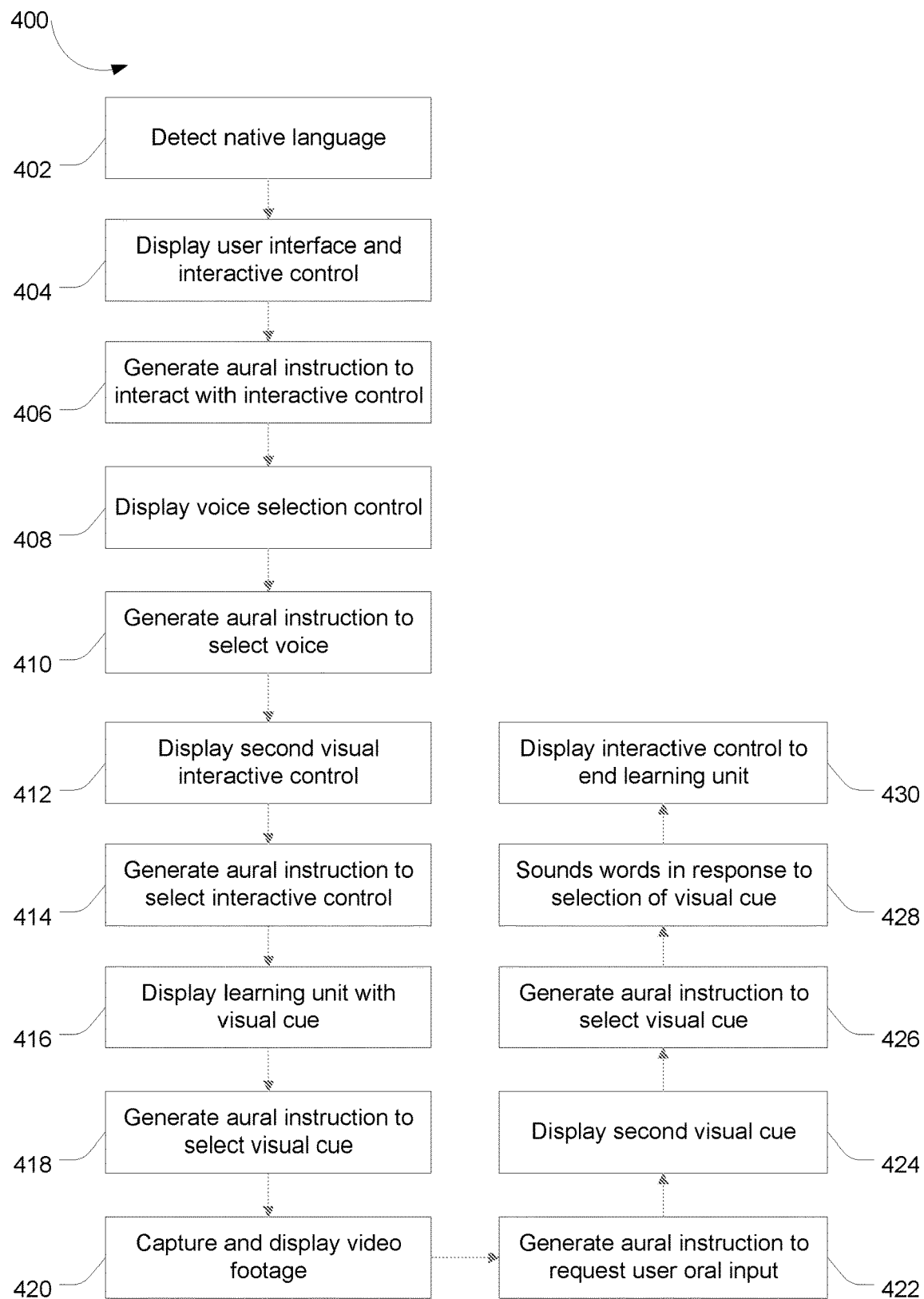
FIG. 4 is a flowchart illustrating an example method for learning to speak according to some aspects of the present disclosure.

FIG. 4 illustrates an exemplary method for teaching a user to learn sounds. The method begins at step 402, where the learning tool is activated as described in step 301 and the learning tool detects a user's native language at this step. This may be done through one or more different techniques. If the device is standalone, it may determine the native language based on the user profile provided by a user or based on the factory settings of the learning tool. Alternatively, if the learning tool is a software application residing on a computing device such as a phone, tablet or PC, the learning tool may detect the language from the device settings.

Figure 5A:
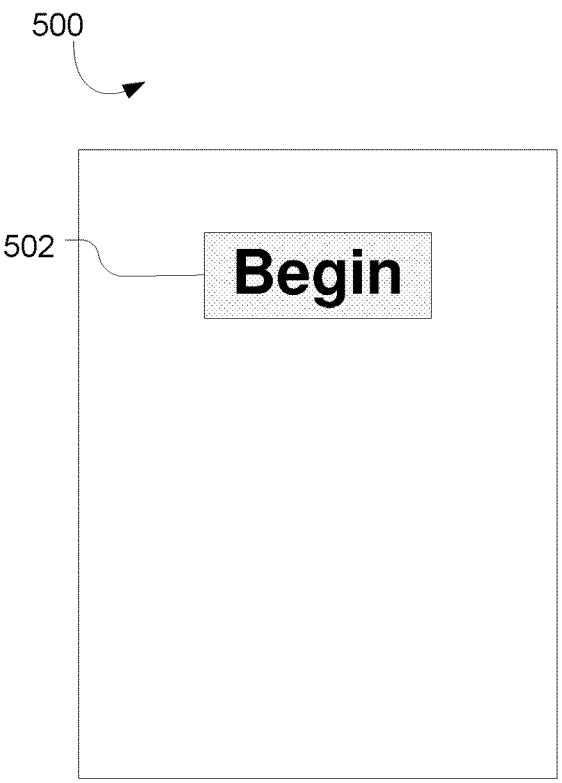
FIGS. 5A-5F illustrate a user interface at different instances during the method of FIG. 4.

Next, at step 404, a user interface 500 is displayed as illustrated in FIG. 5A. The user interface includes a visual selectable interactive control 502, such as a button, an arrow, etc. In this example, it is an interactive button with the text 'begin'. It will be appreciated that the button may not have any text, but may be animated so that the attention of a child that cannot read can be brought to the interactive button.

At step 406, the learning tool 100 generates an aural instruction instructing the user to touch the interactive control. Step 406 may be generated based on a trigger (such as expiry of a predetermined time period).

Figure 5B:
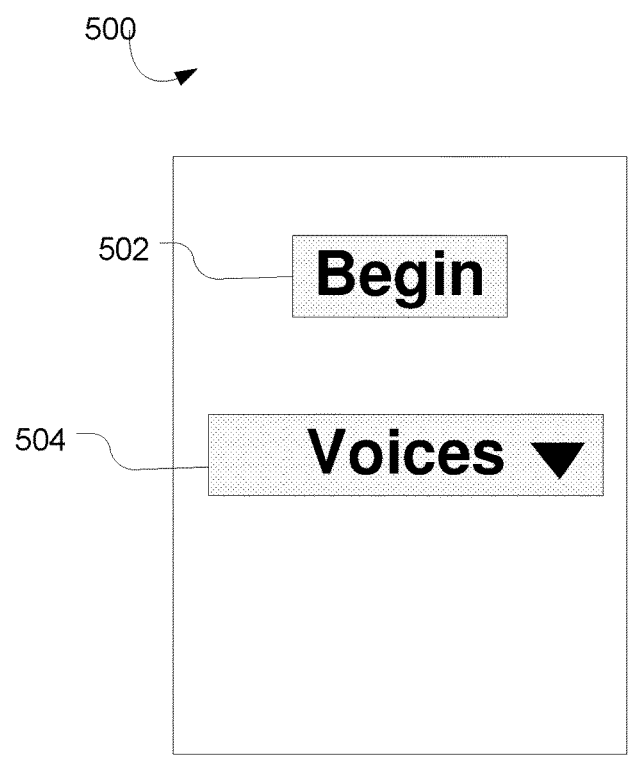

At step 408, in response to a user selecting the interactive control, the learning tool displays a voice selection control 504 for selecting a voice as depicted in FIG. 5B. At this stage, the learning tool 100 allows the user to think about the different choices available and make a selection. The voice selection control 504 may be displayed as a drop down or any other type of interactive menu.

Figure 5C:
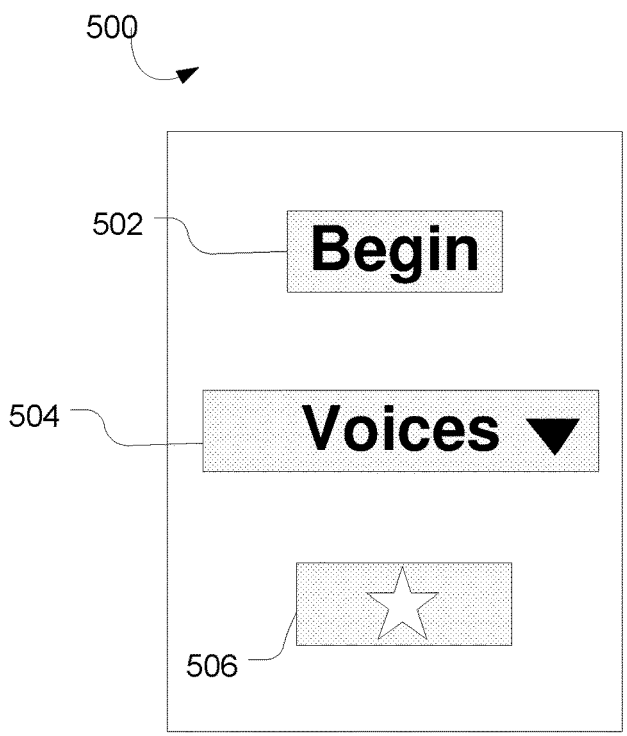

If a voice is not selected for a predetermined period of time, the learning tool may generate an aural instruction to select a voice at step 410. If a voice is selected in response to the aural instruction, the learning tool may display a second visual interactive control 506 as depicted in FIG. 5C at step 412. The user may select this interactive control on their own (having already selected a similar interactive control at step 402). If the control 506 is not selected for a predetermined period of time, the learning tool 100 may generate aural instructions requesting the user to select the second interactive visual control at step 414.

Figure 5D:
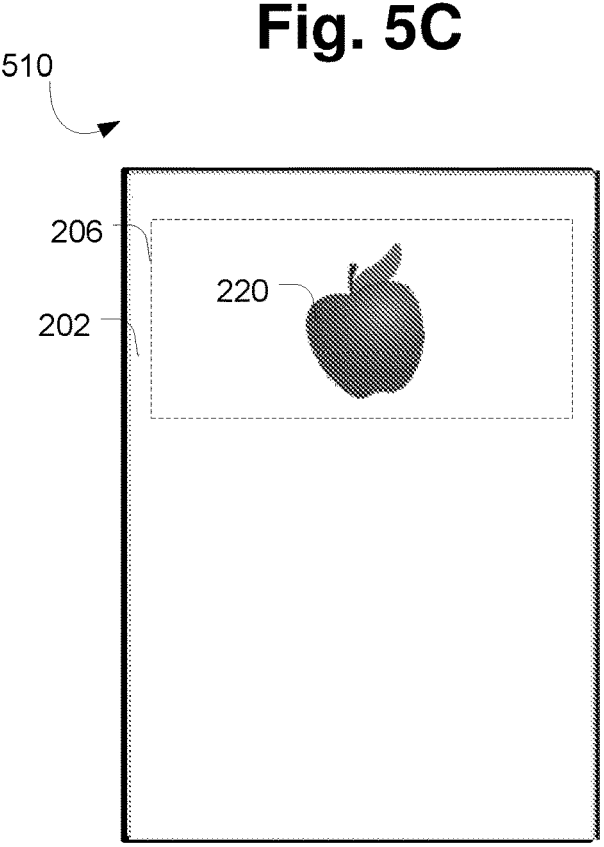

In response to selection of the second interactive visual control, the learning tool 100 displays a user interface 510 as depicted in FIG. 5D at step 416. This user interface represented a learning unit and includes a continuous plane 202 and a selectable visual cue 220 in the visual area 206. As noted previously, the selectable visual cue 220 may be a picture or a word.

The user looks at the visual cue 220 in the user interface 500. While the user is looking at the selectable visual cue 220, the learning tool 100 generates an aural instruction requesting the user to select the selectable visual cue at step 418. The aural instruction performs two functions—it connects the visual cue displayed in step 416 with the video footage displayed in the next step and allows the user to listen, think, and respond. If a user selects the visual selectable cue 220 before the aural instructions are generated, the learning tool 100 may refrain from generating the aural instruction.

Figure 5E:
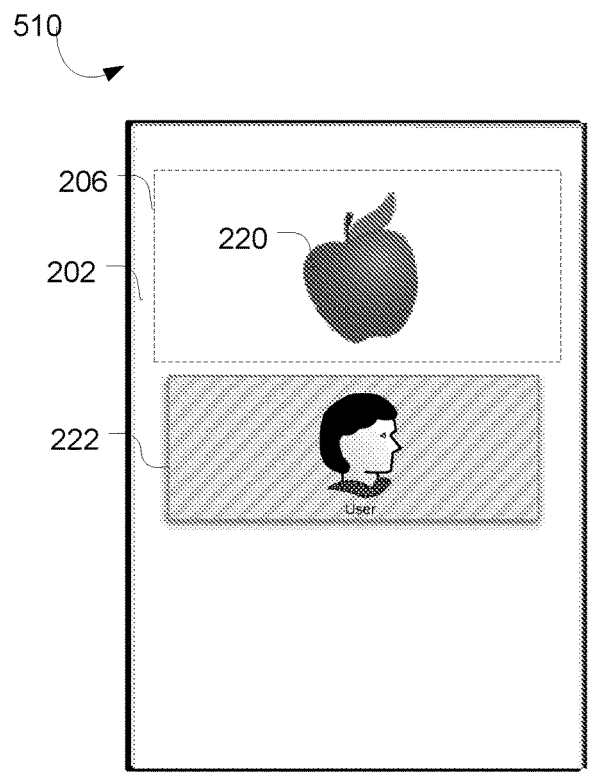

Next at step 420, in response to the user selecting visual cue 220, the learning tool captures footage of the user and displays this footage in the video footage area 208 of the user interface 510 (see FIG. 5E). This step is similar to steps 304-306 of FIG. 3 and therefore is not described in detail again. Once the video footage 222 is displayed, the user may look at themselves in the footage and think about what they are seeing.

At step 422, the learning tool generates another aural instruction requesting the user to say the name of the object displayed in the visual cue 220 while looking at themselves in the video footage 222 (which represents a mirror). This instruction triggers a thinking process—the user thinks about the question and answers it while looking in the mirror. The act of watching their mouth in the mirror (i.e., kinaesthetic) becomes proprioception as the user repeats the word looking at their mouth in the mirror each time.

Figure 5F:
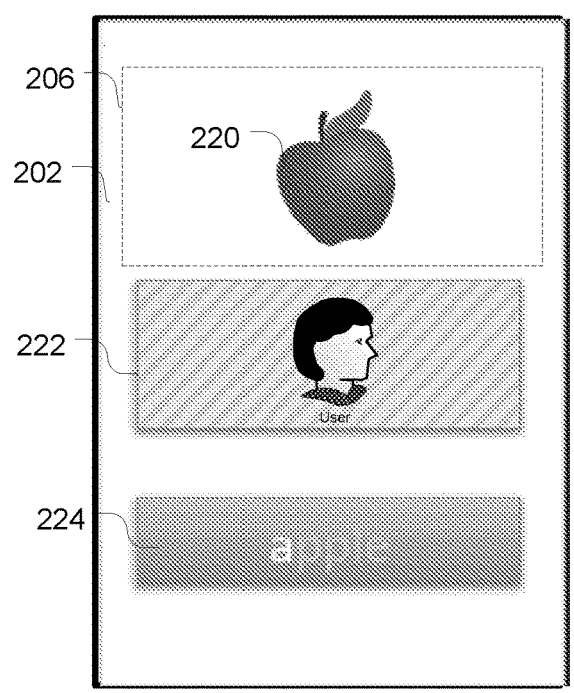

After a predetermined period of time, the learning tool 100 displays a second interactive visual cue 224 below the video footage at step 424 (see FIG. 5F). The second visual cue 224 may be the word represented by the picture in the visual cue 220. In some embodiments, the visual cue 224 may be animated—i.e., flashing, moving on the screen, sliding in and out of the user interface and so on. Such animation is known to attract users to physically connect with the learning connections—the word, picture and mouth movements—to produce a logical thinking connection between the contact points. The user looks at the second visual cue 224, further down on the continuous plane and enters a thinking process—generally thinking how the second interactive visual cue 224 relates to the first visual cue 220 and seeing themselves say the word in the mirror.

After a predetermined time, the learning tool 100 generates a subsequent aural instruction requesting the user to select the second visual cue 224 (at step 426). The predetermined time interval may be programmed to be long enough to allow the user to complete the thinking process described above. After listening to the instruction, the user may select the second visual cue.

In response to selection of the second visual cue, at step 426, the learning tool sounds the word displayed in the second visual cue 224 (at step 428). The sound may be generated and presented in the voice selected by the user at step 410. The user in turn listens to the name of the image and thinks again. At this stage the user has the choice of the next action. The user may repeat the word looking at the mirror, click on the second visual cue again to hear the spoken word (or something different—such as a sentence using the word, or instructions to look at the users mouth again when repeating the word, or instructions to look at the first visual cue, etc.), or simply do nothing.

After a predetermined period of time, at step 430, the learning tool 100 displays a visual cue, such as an arrow suggesting a swipe function, a button, an icon, etc., which when selected by the user ends the current learning unit and starts a next learning unit (essentially repeating steps 416-428).

It will be appreciated that steps 402-414 (i.e., the step preceding display of the learning unit) may be omitted without departing from the scope of the present disclosure. For example, if a user has selected a voice from the settings page the first time the user accesses the learning tool, this user interface may not be displayed at subsequent times when the user accesses the learning tool.

Learning Application 2: Learning to Spell

According to some embodiments, the learning tool 100 helps a user learn to spell in a particular language. Specifically, the tool 100 helps a user practise spelling words.

In this case, the learning process is similar to the process described with reference to FIG. 4 until step 422 (i.e., when the learning tool generates aural instructions to request the user to sound the words represented by the visual cue while looking at their mouth in the mirror area. Thereafter, the learning tool 100 displays in the visual display area 210 a second visual cue 224, an input area 230, and an interactive control 232 (as depicted in FIG. 2C). The second visual cue 224 displays the correct spelling of the word depicted by the first visual cue 220. The learning aid may then instruct the user to enter the spelling of the word depicted in the first visual cue 220 using the input area 230 and select the interactive control 232, when finished. The user selects the input area, enters the spelling (as depicted in the second visual cue 224), and selects the interactive control 232. In response, the learning tool 100 generates an aural output corresponding to the spelling entered by the user. The user then has the opportunity to repeat this process (if the spelling is incorrect, for example), or proceed to the next learning unit (by selecting an interactive control for proceeding).

In this learning process, the user receives visual feedback from the second visual cue 210 already in position below the input area 230 and auditory feedback triggered upon selection of the interactive control 232. As such, the interactive control 232 is linked to the spelling of the word(s) input by the user rather than the word(s) displayed in the second visual cue 224.

It will be appreciated that the visual cues in learning applications 1 and 2 are set to suit a user's requirements for learning—e.g. a-z sounds; consonant blends; and/or vowel blends.

Learning Application 3: Learning to Read and Write in a Language

According to some embodiments, the learning tool 100 helps a user learn a language. Specifically, the tool helps a user perfect the use of a language by checking spellings, and improving/practising pronunciation by watching their mouth move. In this application, the learning tool may be used by users who can speak a language and know many words in that language but find it difficult to become fluent. When learning a language, users need to understand the complex nature of phonemic awareness in order to become fluent in their language. Using the disclosed learning device, the user can have a truly multisensory experience where connections are made between visual, auditory, oral, kinaesthetic, and proprioception in their brains.

Figure 6:
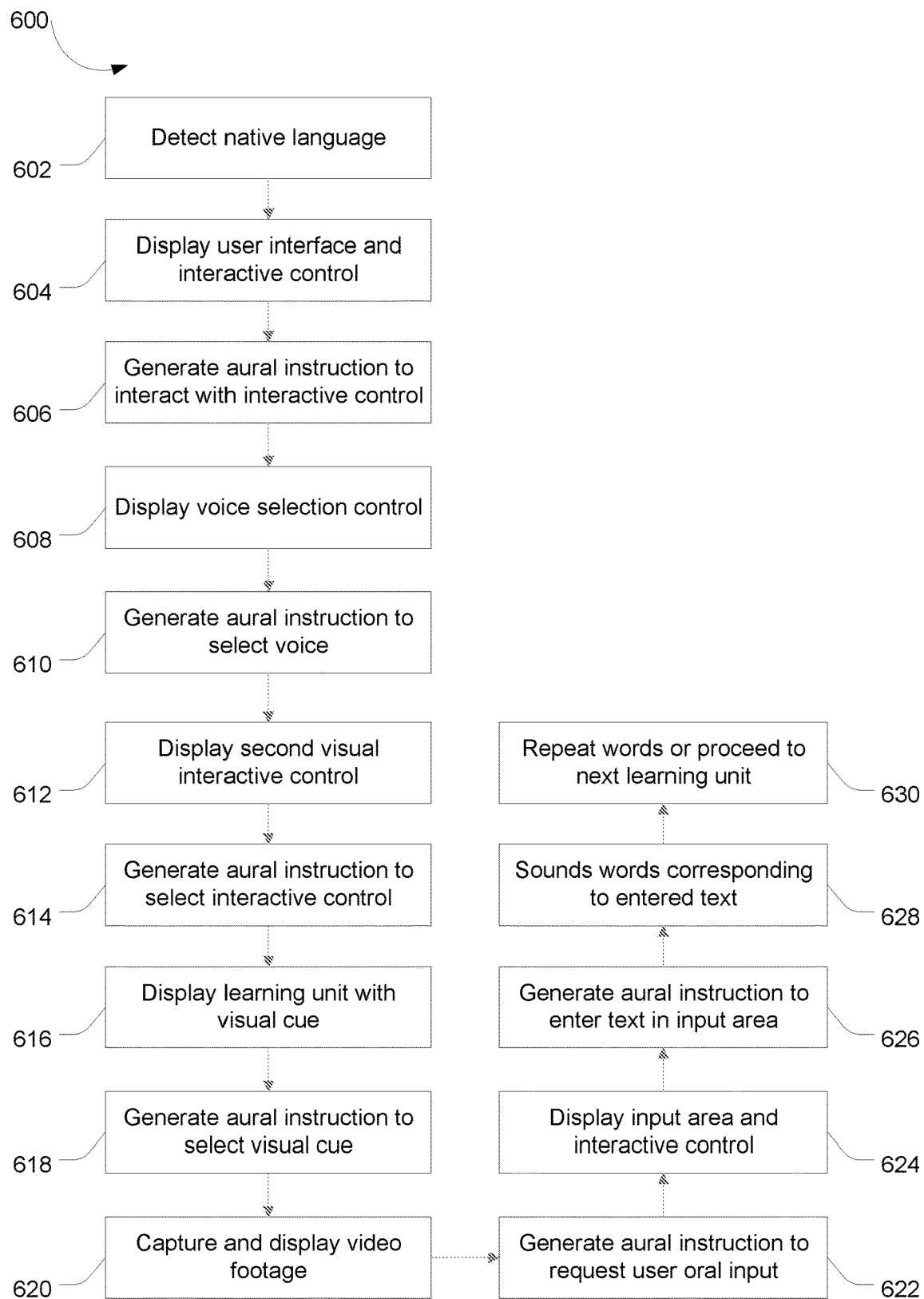
FIG. 6 is a flowchart illustrating an example method for learning to read and write in a language according to some aspects of the present disclosure.
Figure 7A:
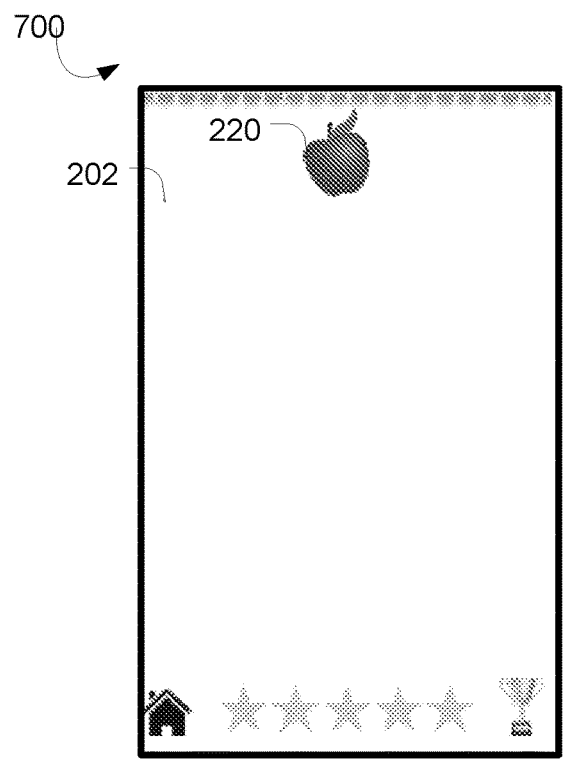
FIGS. 7A-7C illustrate a user interface at different instances during the method of FIG. 6.
Figure 7B:
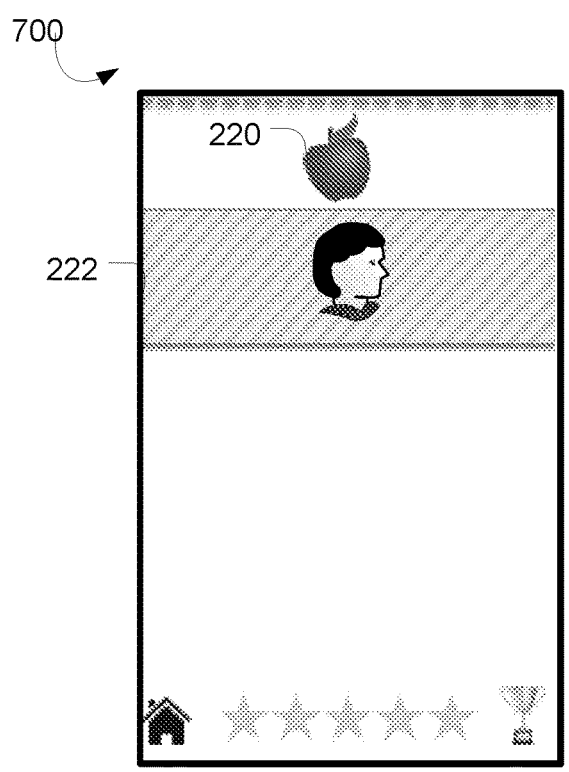

FIG. 6 illustrates an exemplary process for learning a language using the learning tool. The method begins at step 602. It will be appreciated that steps 602-620 of method 600 are similar to method steps 402-420 of method 400 and therefore are not repeated here. In essence, the learning tool 100 detects a user's native language and allows a user to select a voice in which the learning tool generates aural instructions. Once this is done, the learning tool 100 displays a user interface (e.g., interface 700 as depicted in FIG. 7A) with a visual cue 220. Once the user selects the visual cue 220, the learning tool begins capture of a video footage and displays the video footage in the video area 222 as depicting in FIG. 7B.

At step 622, the learning tool 100 generates an aural instruction requesting the user to look in the mirror and say the words they know. In response to the instructions, the user may look at the mirror, think, and says the words they wish to learn to read or write.

Figure 7C:
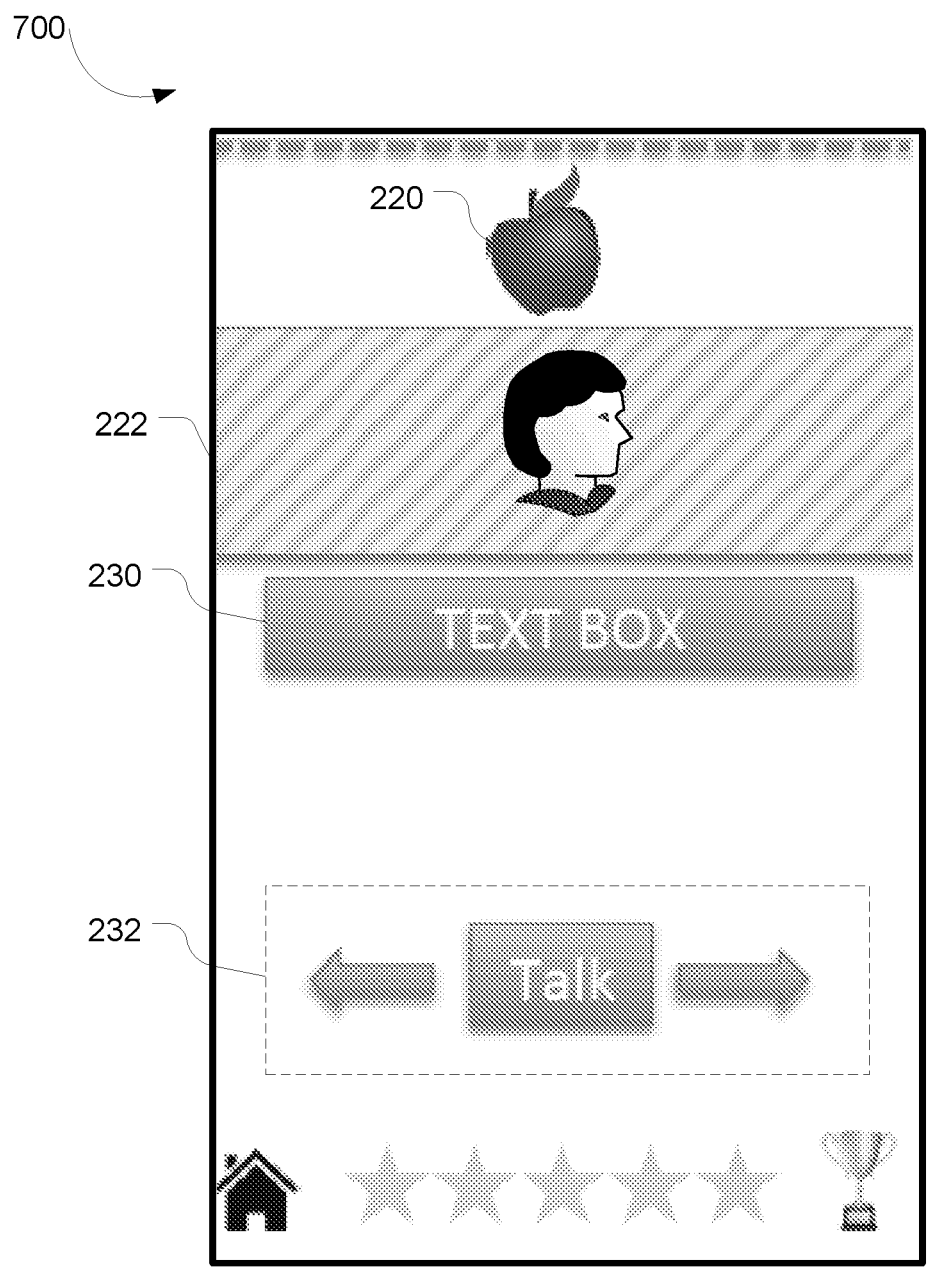

Next (at step 624), the learning tool 100 displays an input area 230, and an interactive control 232 (see FIG. 7C). In some embodiments, the learning tool 100 may display these items after a predetermined interval of time.

In other embodiments, the items may be displayed after the user has finished saying the words they wish to say while looking in the mirror 222. To this end, the learning tool 100 may detect the beginning and ending of a user's voice. If the user does not utter any words for a predetermined period of time, the learning tool 100 may be configured to reinstruct the user to say the words while looking at the mirror 222.

At step 626, the learning tool is configured to generate aural instructions requesting the user to type the words they had said in step 622 and select the interactive control 232 once the user has typed the words.

In response, the user may select the input area 230, enter the text they think corresponds to the words they had previously spoken and then select the interactive control 232.

Selection of the interactive control triggers the learning tool to retrieve the input text and generate an aural output corresponding to the written text at step 628.

The user may listen to the aural output, which initiates a thinking process—did the aural output resemble the words the user had spoken at step 622. If the aural output resembles the user's spoken words, the user may think that their spelling is correct. Otherwise, the user may determine that their spelling was incorrect which resulted in the incorrect pronunciation in the aural output.

At this stage, the user may select an interactive control (the back arrow key in FIG. 7C) to retry the spelling of the spoken words (if they decide that the spelling was incorrect) or an interactive control (the forward arrow key in FIG. 7C) to continue to the next unit of learning (if they decide that the spelling was correct).

This process from step 614 onwards is then repeated for each learning unit. Once the user has decided to end the learning, they may select the home or cup interactive control on the user interface 700 to exit the learning. This may cause the learning tool 100 to generate an end screen which displays the user's progress (for example, the learning units the user correctly completed and in some cases even audio recordings of the user saying the words in each of the correctly completed learning units).

Application 4: Learning a Different Language.

According to some embodiments, the learning tool is configured to allow a user to learn to a new language. Specifically, it is configured to translate user entered text into words in a different language, allow a user to write words, check spellings of the user input text, and help the user improve and practise pronunciation by watching their mouth move. When learning languages, participants need to understand the complex nature of phonemic awareness in order to become fluent. Using the disclosed learning tool, the user can have a truly multisensory experience where connections are made between visual, auditory, oral, kinaesthetic, and proprioception.

Figure 8:
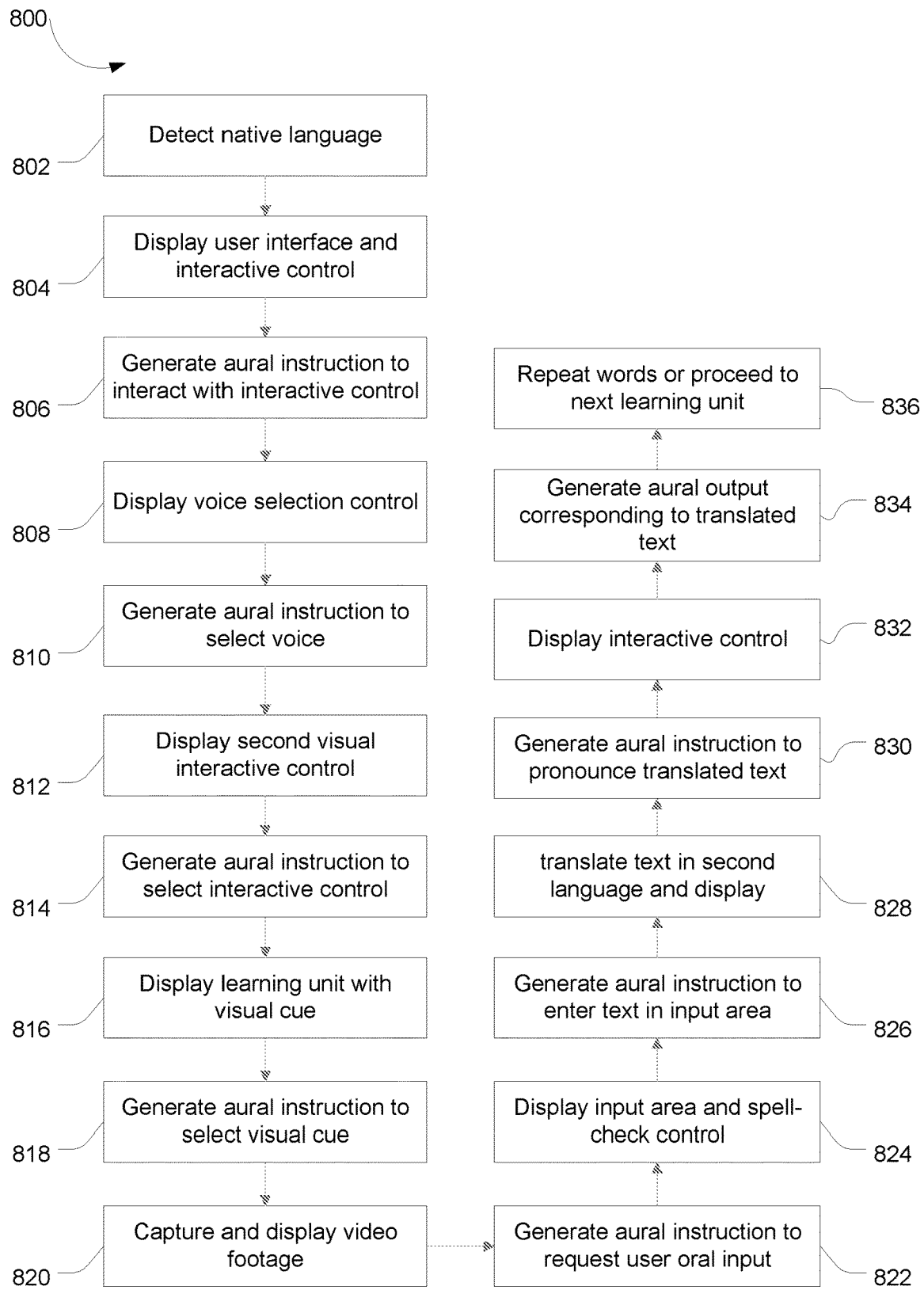
FIG. 8 is a flowchart illustrating an example method for learning a different language according to some aspects of the present disclosure.

FIG. 8 illustrates an exemplary method 800 for learning a different language. The method begins at step 802 where the learning tool detects a user's native language. It will be appreciated that steps 801-822 are similar to corresponding steps of FIG. 6 and therefore these steps are not described here again.

At step 824, the learning tool displays an input box 230, and a spell-check interactive control 262 (see FIG. 2F). In some embodiments, the learning tool 100 may display these items after a predetermined interval of time. In other embodiments, the items may be displayed after the user has finished saying the words they wish to say while looking in the mirror. To this end, the learning tool 100 may detect the beginning and ending of a user's voice. If the user does not utter any words for a predetermined period of time, the learning tool 100 may be configured to reinstruct the user to say the words while looking at the mirror.

Next (step 826), the learning tool 100 is configured to generate aural instructions requesting the user to type the words they said in step 816.

In response, the user may select the input box 230 and enter the text they think corresponds to the words they had previously spoken. When the text is entered, the learning tool 100, in certain embodiments, is configured to translate the input text into the second language at step 828. Before the next text, the user may wish to check the spelling of the entered text. To this end, the user may select the spell-check interactive control, which may generate visual or aural instructions informing the user of any errors in the entered text.

The user may read the translated text and attempt to pronounce the translation while looking at their mouth in the mirror. In certain embodiments, the learning tool 100 may prompt the user to voice the words while looking at the mirror through an aural instruction at step 830.

Either in response to the user's attempt at pronouncing the translated text or after a predetermined time from translating the user text to the second language, the learning tool displays the interactive control 268 at step 832. Selection of the interactive control 268 triggers the learning tool 100 to generate an aural output corresponding to the translated text at step 834.

The user may listen to the aural output, which initiates a thinking process—did the aural output resemble the words the user had spoken at step 826. If the aural output resembles the user's spoken words, the user may think that their pronunciation is correct. Otherwise, the user may determine that their pronunciation was incorrect.

At this stage, the user may repeat the words again (in light of the correct pronunciation) and look at their mouth in the video footage area while repeating the words. Thereafter the used may once again select the interactive control 268 to listen to the correct pronunciation. This repetition and listening to the correct pronunciation may be repeated until the user is satisfied with the pronunciation.

Thereafter, the user may either end the learning process by exiting the learning tool or continue to the next unit of learning (by for example, entering a new phrase in the text box 230.

This process is then repeated for each learning unit. Once the user has decided to end the learning, they may select an interactive control on the user interface to exit the learning. This may cause the learning tool to generate an end screen which displays the user's progress (for example, the learning units the user correctly completed and in some cases even audio recordings of the user says the words in each of the correctly completed learning units).

Other Variations

In certain embodiments, users may be able to upload their own learning content in the learning tool 100. For example, users may be allowed to upload pictures, voices, or sounds. These can then be used as the first visual cue 220. In such embodiments, once the user selected content is uploaded, the learning tool is configured to detect the image name or sound and automatically fill the second visual cue 224. If the learning tool is unable to identify the image or sound, an adult may manually enter the text corresponding to the uploaded content.

In the methods described with reference to FIGS. 4, 6, and 8, once the user utters the particular words (while looking in the mirror), the learning tool does not perform any steps in response to the uttered words, but based on predetermined time intervals. This is a basic version of the learning tool 100.

In other more advanced versions, the learning tool 100 detects and records the user's utterances every time the user speaks and compares the recorded user input with reference voice samples to determine whether the user is sounding the words correctly. In this case, methods 400, 600, and 800 may include additional steps of detecting user input, comparing the input with reference samples, determining correctness of user input, and generating visual or aural output informing the user whether their pronunciations were correct or not. Moreover, in these more advanced versions, the learning tool 100 may be configured to generate some of the aural instructions in response to the user voice input.

In still more advanced versions, the learning tool records the video footage 222 when the user makes sounds for further processing. In these cases, the methods 400, 600, and 800 may include additional steps of detecting user oral input, recording video footage during user oral input, identifying mouth movement in the recorded footage, comparing the identified mouth movement with ideal/reference mouth movements, determining whether user mouth movements are correct or not, and generating visual or aural output informing the user whether their mouth movements are accurate or not.

In the speech recognition and/or facial recognition versions, the learning tool 100 may also be configured to generate some additional aural, visual, or even haptic feedback, e.g., requesting the user to repeat certain words (if the learning tool determined that the oral input was incorrect).

In still other variations, a user may share their learning experience with other people. For example, a child may share his/her progress on the learning tool with a teacher, parent or mentor. In another example, a user may share their language learning experience with a friend. If the friend is also using the tool to learn the same language, the user can use the learning tool not only to share his/her progress but also to share the learning content he/she uses (e.g., the particular videos, texts or images the user loads into the learning tool to learn). In still other embodiments, users may be able to share parts of or one or more entire learning units with one or more other people.

If the person a user wishes to share their learning experience with is already a registered user of the learning tool, the learning tool connects the two users and may allow the initiating user to decide the level of sharing. For example, the user can specify whether they want the other person to only have access to their progress, their learning content, or their entire learning program.

If the person a user wishes to share their learning experience with is not a registered user of the learning tool, the learning tool requests the user for contact details of the person (e.g., email address or phone number) and is configured to invite the person (via email or message) to register with the learning tool.

Further still, sharing users may be able to synchronize their learning activities. For instance, a user may schedule his/her learning activity on the learning tool, which can in turn can notify the user's learning partner of the scheduled learning activity. The learning partner can then initiate their learning session at the same time (using the same learning content). In this way, the learning partners may be able to learn, e.g., a new language, together and discuss their learning afterwards, which may help quicken the learning process.

It will be appreciated that the learning tool described herein may be implemented to aid in language, hearing and speech development. For example, patients suffering from brain injuries may utilize the tool as part of speech therapy. Similarly, hearing impaired users may utilize the tool for improving their speech or even learning sign languages. It will be appreciated that when the learning tool is configured for use by hearing impaired users, aural and oral outputs provided by the learning tool may be replaced by visual and/or haptic outputs (including tactile and kinaesthetic outputs).

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various features of the disclosure have been described using process steps. The functionality/processing of a given process step could potentially be performed in various different ways and by various different systems or system modules. Furthermore, a given process step could be divided into multiple steps and/or multiple steps could be combined into a single step. Furthermore, the order of the steps can be changed without departing from the scope of the present disclosure. Alternatively or in addition, one or more method steps may be omitted or added.

It will be understood that the embodiments disclosed and defined in this specification extends to alternative combinations of two or more of the individual features mentioned or evident from the text or drawings. These different combinations constitute various alternative aspects of the embodiments.

The invention claimed is:

1. A computer implemented method performed by a computing device comprising a display, an image capturing device, and a processor, the method comprising:
generating a user interface on the display of the computing device, the user interface comprising an input area, a video footage area and an interactive button, wherein the input area, video footage area and interactive button are arranged on a single continuous plane comprising a beginning and an end such that the input area is towards the beginning of the single continuous plane, the interactive button is towards the end of the single continuous plane, and the video footage area is positioned between the input area and the interactive button;
receiving user text input in the input area;
displaying the user text input in the input area;
capturing real time footage of a user using the image capturing device while the user interacts with the computing device;
displaying the real time footage of the user in the video footage area;
receiving user input on the interactive button; and
generating an aural output corresponding to the text input entered in the input area.

2. The computer implemented method of claim 1, wherein the input area, the video footage area and the interactive button are arranged sequentially on the display of the computing device.

3. The computer implemented method of claim 1, wherein the input area corresponds to prior learning and the interactive button corresponds to new learning.

4. The computer implemented method of claim 1, further comprising: capturing the real time footage of the user using the image capturing device in response to user interaction with the interactive button.

5. The computer implemented method of claim 1, further comprising: displaying the interactive button a predetermined period of time after display of the real time footage.

6. The computer implemented method of claim 1, further comprising: displaying the interactive button in response to a first user oral input.

7. The computer implemented method of claim 1, further comprising: receiving a first oral input from the user, comparing the first oral input with a reference oral sample, and determining whether the first oral input matches the reference oral sample.

8. The computer implemented method of claim 7 further comprising: generating an aural instruction requesting the user to provide a second oral input when the first oral input does not substantially match the reference oral sample.

9. The computer implemented method of claim 1, further comprising:
   recording the real time footage of the user as the user generate a first oral input;
   determining facial movements of the user from the recorded real time footage;
   comparing the user facial movements with reference facial movements; and
   determining whether the user facial movements match the reference facial movements.

10. The computer implemented method of claim 9 further comprising: generating an aural instruction requesting the user to provide a second oral input when the user facial movements fail to match the reference facial movements.

11. The computer implemented method of claim 1 further comprising:
   translating the user text input into a second language; and displaying the translated text.

12. The computer implemented method of claim 1 further comprising: translating the user text input into a second language, converting the translated text input into speech, and outputting the speech.

13. A learning tool, comprising:
   a display;
   a processor;
   an input device configured to receive user input;
   a memory in communication with the processor, the memory including instructions executable by the processor to cause the processor to display a plurality of user interfaces on the display, each user interface including:
   a user input visual cue area displaying text input by a user of the learning tool, the text input corresponding to prior learning;
   a video footage area displaying a real-time video footage of a user captured by an image capturing device of the learning tool, the footage displaying the user interacting with the learning tool;
   an interactive button associated with the text input by the user in the user input area; and
   wherein the user input area, the video footage area and the interactive button are arranged in sequence in a continuous plane comprising a beginning and an end.

14. The learning tool of claim 13, wherein the user input area, the video footage area and the interactive button are arranged such that the user input area is towards the beginning of the continuous plane, the interactive button is towards the end of the continuous plane, and the video footage area is positioned between the user input area and the interactive button.

15. The learning tool of claim 13, wherein the real-time video footage is displayed in the video footage area in response to detecting the user inputting text in the user input area using the input device.

16. The learning tool of claim 13, wherein the video footage area displays a real-time footage of a user's face.

17. The learning tool of claim 13, further comprising one or more output devices configured to output aural instructions in response to detecting user interaction with the interactive button.

18. The learning tool of claim 13, wherein the memory including instructions executable by the processor to cause the processor to: receive a first oral input from the user, compare the first oral input with a reference oral sample, and determine whether the first oral input matches the reference oral sample.

19. The learning tool of claim 18, wherein the memory further including instructions executable by the processor to cause the processor to: generate an aural instruction requesting the user to provide a second oral input when the first oral input does not substantially match the reference oral sample.

20. The learning tool of claim 13, wherein the memory further including instructions executable by the processor to cause the processor to:
   record real time footage of the user when the user utters a first oral input;
   determine facial movements of the user from the recorded real time footage;
   compare the user facial movements with reference facial movements;
   determine whether the user facial movements match the reference facial movements; and
   generate an aural instruction requesting the user to provide a second oral input when the user facial movements fail to match the reference facial movements.

* * * * *

UNITED STATES PATENT AND TRADEMARK OFFICE
CERTIFICATE OF CORRECTION

PATENT NO. : 11,210,964 B2
APPLICATION NO. : 16/466939
DATED : December 28, 2021
INVENTOR(S) : Anna Gill Page 1 of 1

It is certified that error appears in the above-identified patent and that said Letters Patent is hereby corrected as shown below:

In the Claims

Claim 13, Column 21, Line 39 delete "visual cue"

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*